United States Patent [19]

Wakami et al.

[11] 3,861,622

[45] Jan. 21, 1975

[54] MAGNETIC TAPE DRIVE SYSTEM

[75] Inventors: Noboru Wakami, Hirakata; Toshiomi Yabu, Kyoto; Hiroo Hosono, Hirakata, all of Japan

[73] Assignee: Matsushita Electric Industrial Co., Ltd., Kadoma-shi, Osaka, Japan

[22] Filed: Nov. 9, 1973

[21] Appl. No.: 414,213

[30] Foreign Application Priority Data

Nov. 20, 1972 Japan .............................. 47-116950

[52] U.S. Cl. ..................... 242/188, 242/195, 360/74

[51] Int. Cl. .... B65h 59/38, G03b 1/04, G11b 15/06

[58] Field of Search ............................ 242/188–195; 274/4 D, 11 D; 178/7, 2; 179/100.2 S, 100.2 PS

[56] References Cited

UNITED STATES PATENTS 3,127,120 3/1964 Selsted et al. ........................ 242/188

3,706,844 12/1972 Besier et al. ........................ 178/7.2

*Primary Examiner*—Leonard D. Christian

*Attorney, Agent, or Firm*—Stevens, Davis, Miller & Mosher

[57] ABSTRACT

A magnetic tape drive system for controlling a tape consisting of a magnetic tape provided at the leading end with a transparent leader tape and at the trailing end with a transparent trailer tape according to the output of a detecting means for discriminating the magnetic tape from the transparent tape when the tape is travelling along a tape path. The rewinding state can be brought about at any time. The tape is stopped a predetermined time after the detection of the transparent tape by the detecting means. Playback or fast feed is possible only when the detecting means provide a magnetic tape detection output.

5 Claims, 5 Drawing Figures

MAGNETIC TAPE DRIVE SYSTEM

This invention relates to magnetic tape drive systems for magnetic recording and reproducing systems such as video tape recorders and video printers where magnetic tape is taken up from a supply reel on a take-up reel or rewound on the supply reel.

Heretofore, it has been contemplated to control the magnetic tape drive system for driving a tape consisting of a magnetic tape provided at the leading end with a transparent leader tape more rigid than the magnetic tape and at the trailing end with a transparent trailer tape through discrimination of the transparent leader tape and trailer tape from the magnetic tape by a photo-sensor provided on a tape path.

However, while a single photo-sensor can discriminate the leader tape or trailer tape from the magnetic tape, it cannot discriminate between the leader tape and trailer tape. Therefore, whether the transparent tape is the leader tape or trailer tape has heretofore been determined from the angle of a detecting lever urged against the tap roll on the take-up reel or by the output of an indicator corresponding to the number of rotations of the supply reel. In other words, to this end a separate detecting means has been necessary in addition to the photo-sensor.

The primary object of the present invention is to achieve requisite control at the leading or trailing end of the magnetic tape according to the output of a single photo-sensor without using any additional detecting means.

Another object of the invention is to provide a tape drive system, which stops its operation immediately upon the detection of the trailer tape or the leader tape in the playback mode and the fast feed mode, and also stops its operation a predetermined delay time after the detection of the trailer tape or the leader tape in the rewinding mode.

Still another object of the invention is to provide a tape drive system, with which the playback or fast feed operation is not possible but only the rewinding operation is possible in the absence of magnetic tape at a predetermined point in the tape path.

According to the invention, an auto-stop means is actuated immediately upon detection of the trailer tape while it is actuated a predetermined delay time after the detection of the leader tape, so that it is not necessary to provide any detecting lever or indicator. Thus, it is possible to simplify the construction and reduce the weight and cost of the system.

The above and other objects, features and advantages of the present invention will become more apparent from the following description taken in conjunction with the accompanying drawings, in which.

Figure 1:
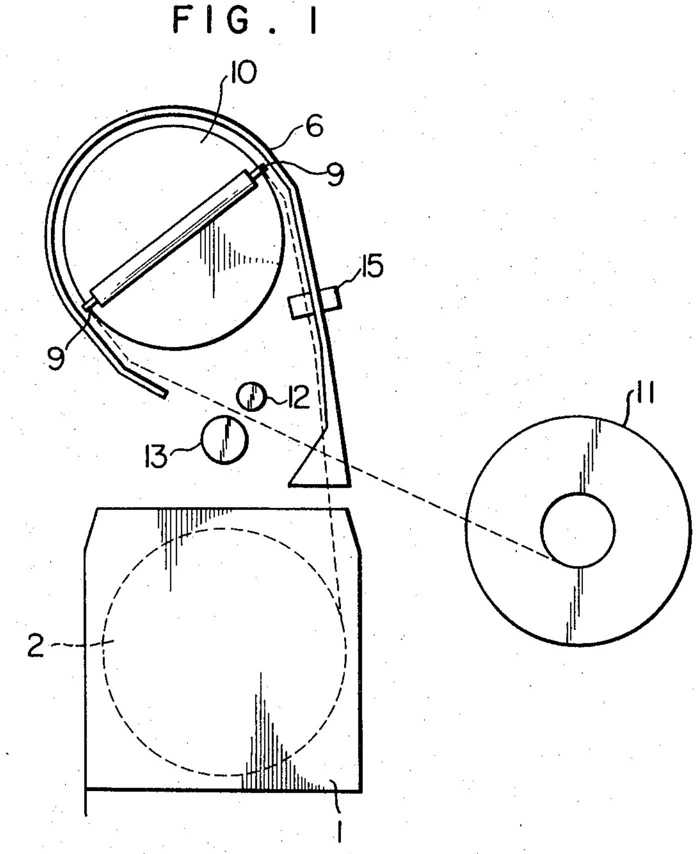
FIG. 1 is a schematic representation of a arrangement of various parts of a magnetic recording and reproducing system incorporating a magnetic tape drive system according to the invention together with a showing of a tape path.
Figure 2:
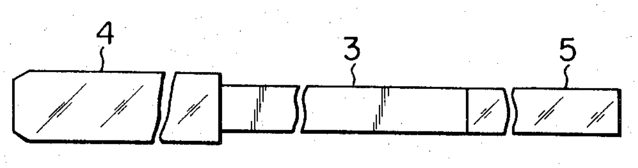
FIG. 2 is a view which shows an example of the tape used in accordance with the invention.
Figure 3:
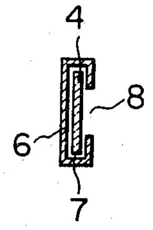
FIG. 3 is a sectional view showing a leader tape guide.

FIG. 1 shows a schematic plan view of a magnetic recording and the reproducing system of the so-called autothreading type capable of automatically threading the magnetic tape accommodated in a cartridge through a predetermined tape path up to the take-up reel. Referring to the figure, reference numeral 1 designates a cartridge accommodating a supply reel 2, on which is wound a magnetic tape provided at the leading end thereof with a transparent leader tape 4 slightly wider than the magnetic tape 3 and having some rigidity and at the trailing end with a transparent trailer tape 5, as shown in FIG. 2. Numeral 6 designates a leader tape guide. As shown in FIG. 3, it forms a space 7 for guiding the leader tape 4 and is formed on its one side with a slit 8 extending through its entire length and wider than the magnetic tape but narrower than the leader tape.

Figure 4:
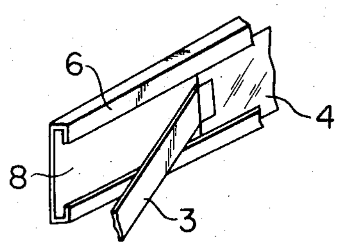
FIG. 4 is a perspective view of the same leader tape guide.

The leader tape 4 forwarded from the cartridge 1 is guided along the leader tape guide 6 by virtue of its rigidity to a take-up reel 11, and it is adapted to be progressively taken up on the take-up reel 11 by well known means. The magnetic tape 3 following the leader tape 4 departs from the leader tape guide 6 since it is narrower than the slit 8 of the guide, as shown in FIG. 4, and it is passed round a tape guide 10 for a predetermined angle, as shown by the dashed line in FIG. 1, for recording or playback with a rotary head assembly 9.

Numerals 12 and 13 respectively designate a pinch roller and a capstan. Numerals 15 and 34 designate a light source and a photo-transistor, both being provided on opposite sides of the tape proceeding along the tape path such that they face each other through the tape.

Figure 5:
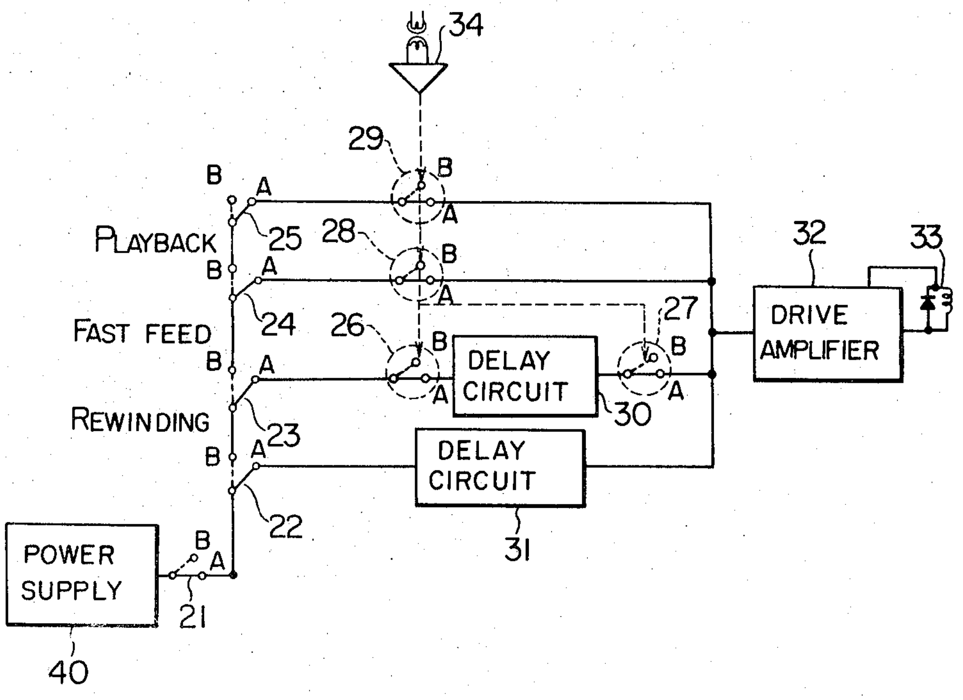
FIG. 5 is an electrical connection diagram showing an example of the control system according to the invention.

FIG. 5 shows a tape drive control system featured by this invention. In the figure, numeral 21 designates a switch, whose pole is adapted to be in contact with contact A when the cartridge is set in the system. Numeral 22 designates a switch adapted to be in contact with contact A during the threading operation and thrown to contact B when an auto-stop solenoid 33 described later is energized. Numerals 23, 24 and 25 designate a rewinding knob, a fast feed knob and a playback knob respectively each knob being depressed to throw it to its A side. Numerals 26, 27, 28 and 29 designate switches whose poles are in contact with contact A when no magnetic tape (or "white") is detected by the photo-sensor 34 and are thrown to the side of contact B when the photo-sensor detects the magnetic tape (or "black").

When the cartridge is loaded in the system, the switch 21 is thrown to the side A, and also a switch (not shown) interlocked to this switch 21 is closed to cause the threading operation, that is, cause the leader tape 4 to be forwarded from the cartridge 1.

When the threading operation is started, the switch 22 is thrown to the side A, so that the voltage from a power supply 40 is coupled through the switches 21 and 22 to a delay circuit 31. The delay circuit 31 is adapted to produce an output after a delay required from the appearance of the source voltage until the recording or playback state is brought about with the magnetic tape 3 following the leader tape passed round the tape guide 10. The output of the delay circuit 31 is coupled through a drive amplifier 32 to an auto-stop solenoid 33 for stopping the threading operation.

When the threading operation is stopped, the switch 22 is thrown back to the B side.

When the threading is completed by the threading operation, the photo-sensor 34 detects "black" since the magnetic tape 3 is now present in front of the photo-sensor 34. Upon detection of "black," the switches 26, 27, 28 and 29 are thrown to the B side.

In this state, the auto-step solenoid 33 will not be energized even if one of the switches 23, 24 and 25 respectively interlocked to the rewinding knob, fast feed knob and playback knob is closed, so that it is possible to cause rewinding, fast feed or playback operation.

In the event the threading is not completed when the threading operation is stopped, "white" continues to be detected by the photo-sensor 34 so that the switches 26, 27, 28 and 29 remains on the A side. In this case, by depressing the fast feed knob or playback knob the auto-stop solenoid 33 would be energized through the switches 21, 22, 23, 24 and 28 or through the switches 21, 22, 23, 24, 25 and 29, thus rendering the system inoperative. This means that in this case the fast feed state or playback mode cannot be established, so that it is possible to prevent the tape from being accidentally damaged.

In case of incomplete threading, it is necessary to be able to effect rewinding. In this case, by depressing the rewinding knob the switch 23 is thrown to the A side, whereupon the source voltage is coupled through this switch 23 and the switch 26 to a delay circuit 30. The delay circuit 30 is adapted to produce an after a delay time required for fully rewinding the leader tape 4 or trailer tape 5 from the application of its input voltage.

Thus, in case of incomplete threading it is possible to cause the rewinding operation for the delay period of the delay circuit 30 before the system is automatically stopped.

When the trailer tape 5 provides at the magnetic tape 3 is detected by the photo-sensor 34 in the playback mode or fast feed mode, the switch 29 or 28 is turned to the A side, so that the system is automatically stopped.

Again in this state, by depressing the rewinding knob the rewinding operation can be effected. Also, before the generation of the output of the delay circuit 30 the photo-sensor 34 detects "black," turning the switches 26 and 27 to the B side, so that the rewinding operation can be continued.

Near the end of the rewinding, the photo-sensor 34 detects the leader tape 4. Then after the delay time of the delay circuit 30 the stop solenoid 33 is activated, but by this time the leader tape will be completely rewound on the supply reel.

What we claim is:

1. A magnetic tape drive system comprising;

a tape consisting of a magnetic tape provided at the leading end with a transparent leader tape and at the trailing end with a transparent trailer tape;

a take-up means for taking up said tape on a take-up reel through a predetermined tape path from a supply reel on which said tape is wound;

a rewinding means for rewinding said tape on said supply reel;

a detecting means provided in said predetermined tape path for discriminating the transparent tapes from the magnetic tape;

stopping means for releasing said rewinding means; and source voltage supplying means for supplying a source voltage to said stopping means, said source voltage supplying means including a first series circuit consisting of a first switch for driving said rewinding means when the first switch is closed, a second switch adapted to be closed upon detection of the transparent tape by said detecting means and a delay circuit.

2. A magnetic tape drive system comprising:

a tape consisting of a magnetic tape provided at the leading end with a transparent leader tape and at the trailing end with a transparent trailer tape;

a take-up means for taking up said tape on a take-up reel through a predetermined tape path from a supply reel on which said tape is wound;

a rewinding means for rewinding said tape on said supply reel;

a detecting means provided in said predetermined tape path for discriminating the transparent tapes from the magnetic tape;

a fast feeding means for feeding the tape first on said take-up reel;

source voltage supplying means for supplying a source voltage to said stopping means, said source voltage supplying means including a first series circuit consisting of a first switch for driving said rewinding means when the first switch is closed, a second switch adapted to be closed upon detection of the transparent tape by said detecting means and a delay circuit; and a second series circuit in parallel with said source voltage supplying means, said second series circuit including a third switch adapted to drive said fast feeding means when the third switch is closed, and a fourth switch adapted to be closed upon detection of the magnetic tape by said detecting means.

3. A magnetic tape drive system comprising:

a tape consisting of a magnetic tape provided at the leading end with a transparent leader tape and at the trailing end with a transparent trailer tape;

a take-up means for taking up said tape on a take-up reel through a predetermined tape path from a supply reel on which said tape is wound;

a rewinding means for rewinding said tape on said supply reel;

a detecting means provided in said predetermined tape path for discriminating the transparent tapes from the magnetic tape;

a playback feeding means for feeding the tape at playback speed on the take-up reel;

source voltage supplying means for supplying a source voltage to said stopping means, said source voltage supplying means including a first series circuit consisting of a first switch for driving said rewinding means when the first switch is closed, a second switch adapted to be closed upon detection of the transparent tape by said detecting means and a delay circuit; and a third series circuit in parallel with said source voltage supplying means, said third series circuit including a fifth switch adapted to drive said playback feeding means when the fifth switch is closed, and a sixth switch adapted to be closed upon detection of the magnetic tape by said detecting means.

4. A megnetic tape drive system comprising:

a tape consisting of a magnetic tape provided at the leading end with a transparent leader tape and at the trailing end with a transparent trailer tape;

a take-up means for taking up said tape on a take-up reel through a predetermined tape path from a supply reel on which said tape is wound;

a rewinding means for rewinding said tape on said supply reel;

a detecting means provided in said predetermined tape path for discriminating the transparent tapes from the magnetic tape;

stopping means for releasing said rewinding means; and source voltage supplying means for supplying a source voltage to said stopping means, said source voltage supplying means including a first series circuit consisting of a first switch for driving said rewinding means when the first switch is closed, a second switch adapted to be closed upon detection of the transparent tape by said detecting means and a delay circuit, the delay time of said delay circuit being longer than the time required for taking up the leader tape or trailer tape in the rewinding mode.

5. A magnetic tape drive system comprising:

a tape consisting of a magnetic tape provided at the leading end with a transparent leader tape and at the trailing end with a transparent trailer tape;

a take-up means for taking up said tape on a take-up reel through a predetermined tape path from a supply reel on which said tape is wound;

a rewinding means for rewinding said tape on said supply reel;

a detecting means provided in said predetermined tape path for discriminating the transparent tapes from the magnetic tape;

stopping means for releasing said rewinding means;

source voltage supplying means for supplying a source voltage to said stopping means, said source voltage supplying means including a first series circuit consisting of a first switch for driving said rewinding means when the first switch is closed, a second switch adapted to be closed upon detection of the transparent tape by said detecting means and a delay circuit;

a seventh switch inserted beween said source voltage supplying means and said source voltage, said seventh switch being closed during auto-threading; and a second delay circuit connected between said seventh switch and said stopping means to connect said voltage source to said stopping means.

* * * * *